(12) United States Patent
Sterling et al.

(10) Patent No.: US 12,330,295 B2
(45) Date of Patent: Jun. 17, 2025

(54) TAPERED HYDRAULIC HOSE, METHODS OF MAKING, AND APPLICATIONS THEREOF IN ROBOT SYSTEMS

(71) Applicant: Sanctuary Cognitive Systems Corporation, Vancouver (CA)

(72) Inventors: George E. G. Sterling, Vancouver (CA); Connor Richard Shannon, Vancouver (CA); Douglas Bruce Jelstad, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 406 days.

(21) Appl. No.: 17/833,998

(22) Filed: Jun. 7, 2022

(65) Prior Publication Data

US 2022/0390045 A1 Dec. 8, 2022

Related U.S. Application Data

(60) Provisional application No. 63/197,653, filed on Jun. 7, 2021.

(51) Int. Cl.
| | |
|---|---|
| *B25J 19/00* | (2006.01) |
| *B25J 9/14* | (2006.01) |
| *B25J 9/20* | (2006.01) |
| *F16L 11/12* | (2006.01) |
| *B25J 15/00* | (2006.01) |

(Continued)

(52) U.S. Cl.
CPC .............. *B25J 19/0029* (2013.01); *B25J 9/20* (2013.01); *B25J 19/0025* (2013.01); *F16L 11/12* (2013.01); *F16L 11/121* (2013.01); *B25J 9/14* (2013.01); *B25J 15/0009* (2013.01); *B29C 55/22* (2013.01); *B29L 2023/005* (2013.01)

(58) Field of Classification Search
CPC .... F15D 1/04; F15D 1/025; F15D 1/02; F16L 11/12; F16L 11/121
USPC ..... 138/39, 44, 177, 178, DIG. 11; 264/296, 264/236, 325, 209.4, 230, 342 R, 264/DIG. 71; 901/22, 37
See application file for complete search history.

(56) References Cited

U.S. PATENT DOCUMENTS

| | | | |
|---|---|---|---|
| 1,305,668 A * | 6/1919 | Rieger et al. .......... | F16L 27/111 138/44 |
| 1,744,842 A * | 1/1930 | Suverkrop ............ | F16L 55/027 138/44 |

(Continued)

*Primary Examiner* — Kenneth Rinehart
*Assistant Examiner* — Richard K. Durden
(74) *Attorney, Agent, or Firm* — Thomas Mahon

(57) ABSTRACT

A robot has a body, a hydraulic control system physically coupled to the body, and a hydraulically-actuated component physically coupled to the body. The hydraulically-actuated component is hydraulically coupled to the hydraulic control system by a hydraulic hose. The hydraulic hose has a length, at least a portion of which extends from a first end to a second end, and a diameter, wherein the diameter of the hydraulic hose at both the first end and the second end is a first diameter, and wherein the at least a portion of the length includes a tapered section in which the diameter of the hydraulic hose decreases, continuously and monotonically, to a second diameter, the second diameter being less than the first diameter. The body includes a restricted region through which the hydraulic hose passes in traversing a path between the hydraulic control system and the hydraulically-actuated component.

12 Claims, 10 Drawing Sheets

(51) Int. Cl.
*B29C 55/22* (2006.01)
*B29L 23/00* (2006.01)

(56) References Cited

U.S. PATENT DOCUMENTS

| | | | | |
|---|---|---|---|---|
| 1,940,921 A * | 12/1933 | Smith, Jr. | ................. | G01F 1/42 |
| | | | | 138/44 |
| 2,679,866 A * | 6/1954 | Crawford | ............. | A23G 3/0294 |
| | | | | 138/44 |
| 3,733,901 A * | 5/1973 | Halmi | ....................... | G01F 1/44 |
| | | | | 138/44 |
| 3,733,902 A * | 5/1973 | Halmi | ....................... | G01F 1/44 |
| | | | | 138/44 |
| 4,452,277 A * | 6/1984 | Wells | .................. | F16L 25/0018 |
| | | | | 138/40 |
| 5,080,000 A * | 1/1992 | Bubic | ..................... | B25J 18/06 |
| | | | | 92/92 |
| 5,570,920 A * | 11/1996 | Crisman | ................... | B25J 9/104 |
| | | | | 294/111 |
| 5,686,041 A * | 11/1997 | Ally | ....................... | B29B 11/10 |
| | | | | 264/296 |
| 5,848,619 A * | 12/1998 | Ally | ....................... | F16L 11/12 |
| | | | | 264/296 |
| 8,469,424 B2 * | 6/2013 | Takenaka | ................ | B25J 9/144 |
| | | | | 294/198 |
| 8,951,303 B2 * | 2/2015 | Dehoff | .................... | A61F 2/586 |
| | | | | 623/64 |
| 2002/0135334 A1 * | 9/2002 | Uematsu | .............. | B25J 19/0029 |
| | | | | 318/568.21 |
| 2007/0227605 A1 * | 10/2007 | Sakazaki | ............... | B29C 48/09 |
| | | | | 264/209.3 |
| 2011/0288681 A1 * | 11/2011 | Hayakawa | ........... | B25J 15/0009 |
| | | | | 901/22 |
| 2012/0186684 A1 * | 7/2012 | Giovannetti | ......... | B29D 23/001 |
| | | | | 138/137 |
| 2015/0068634 A1 * | 3/2015 | Katayama | .............. | B29C 49/04 |
| | | | | 138/118 |

* cited by examiner

TAPERED HYDRAULIC HOSE, METHODS OF MAKING, AND APPLICATIONS THEREOF IN ROBOT SYSTEMS

TECHNICAL FIELD

The present systems, devices, and methods generally relate to hydraulic hose, and particularly relate to tapered hydraulic hose for hydraulically-actuated robotic arms.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

BRIEF SUMMARY

A hydraulic hose may be summarized as having a length, at least a portion of the length which extends from a first end to a second end, and a diameter, wherein the diameter of the hydraulic hose at both the first end and the second end is a first diameter, and wherein the at least a portion of the length includes a tapered section, the tapered section which includes a first taper in which the diameter of the hydraulic hose decreases, along a length of the first taper, continuously and monotonically, from the first diameter to a second diameter, the second diameter being less than the first diameter.

In some implementations, the diameter of the hydraulic hose is an inner diameter. In some implementations, the diameter of the hydraulic hose is an outer diameter. In some implementations, the hydraulic hose is a flexible hose. In some implementations, the hydraulic hose is a thermoplastic hose. In some implementations, the plastic hose is a nylon hose. In some implementations, the hydraulic hose is a rubber hose. In some implementations, a volume of the hydraulic hose is at least partially filled with a hydraulic fluid. In some implementations, the hydraulic fluid is an oil.

In some implementations, the tapered section further comprises a waist where the diameter of the hydraulic hose is the second diameter along a length of the waist, and a flare in which the diameter of the hydraulic hose increases, along a length of the flare, continuously and monotonically, from the second diameter to the first diameter.

In some implementations, the tapered section includes a second taper in which the diameter of the hydraulic hose decreases, along a length of the second taper, continuously and monotonically, from the second diameter to a third diameter. The length of the second taper may be different from the length of the first taper.

In some implementations, the at least a portion of the length includes at least one additional tapered section where the diameter of the hydraulic hose changes, continuously and monotonically, to at least one additional diameter that is less than the first diameter.

A robot may be summarized as comprising a body, a hydraulic control system physically coupled to the body, and a hydraulically-actuated component physically coupled to the body, the hydraulically-actuated component hydraulically coupled to the hydraulic control system by a first hydraulic hose, the first hydraulic hose having a length, at least a portion of the length which extends from a first end to a second end, and a diameter, wherein the diameter of the first hydraulic hose at both the first end and the second end is a first diameter, and wherein the at least a portion of the length includes a first tapered section in which the diameter of the first hydraulic hose decreases, continuously and monotonically, to a second diameter, the second diameter being less than the first diameter.

In some implementations, the hydraulically-actuated component is an actuation piston. In some implementations, the hydraulic control system comprises a hydraulic pump, an accumulator, a reservoir, at least one pressure valve, and at least one exhaust valve. In some implementations, the body includes a robotic arm, the robotic arm includes a hand, and the hydraulically-actuated component is physically coupled to the hand and operable to cause a motion of at least a portion of the hand. In some implementations, the body includes a restricted region through which the at least a portion of the length of the first hydraulic hose passes in traversing a path between the hydraulic control system and the hydraulically-actuated component.

In some implementations, the robot further comprises a second hydraulic hose, the second hydraulic hose having a length, at least a portion of the length which extends from a third end to a fourth end, and a diameter, wherein the diameter of the second hydraulic hose at both the third end and the fourth end is a third diameter, and wherein the at least a portion of the length includes a second tapered section in which the diameter of the second hydraulic hose decreases, continuously and monotonically, to a fourth diameter, the fourth diameter being less than the third diameter, wherein the at least a portion of the length of the second hydraulic hose passes through the restricted region. The restricted region may be a pivot joint.

A method of adding at least one tapered section to a hydraulic hose may be summarized as comprising affixing a first end of at least a portion of the hydraulic hose to a first suspension point, hanging a first weight from a second end of the at least a portion of the hydraulic hose, applying heat to a first region of the at least a portion of the hydraulic hose, monitoring a displacement of the first weight, and removing heat from the first region of the at least a portion of the hydraulic hose when the displacement of the first weight meets or exceeds a predetermined threshold.

In some implementations, the applying heat to a first region of the at least a portion of the hydraulic hose includes applying heat by an external heat source to the first region of the at least a portion of the hydraulic hose. The applying heat by an external source to the first region of the at least a portion of the hydraulic hose may include applying heat by an electric heater.

In some implementations, the method further comprises hanging a second weight from the second end of the at least a portion of the hydraulic hose, applying heat to a second region of the at least a portion of the hydraulic hose, monitoring a displacement of the second weight, and removing heat from the second region of the at least a portion of the hydraulic hose when the displacement of the second weight meets or exceeds a predetermined threshold.

In some implementations, the removing heat from the first region of the at least a portion of the first hydraulic hose when the displacement of the first weight meets or exceeds a predetermined threshold causes the at least one tapered section to include a predetermined taper.

The affixing a first end of at least a portion of the hydraulic hose to a first suspension point may include affixing a first end of at least a portion of a thermoplastic hose.

A method of adding at least one respective tapered section to each of a first and a second hydraulic hose may be summarized as comprising affixing a first end of at least a portion of the first hydraulic hose to a first suspension point, hanging a first weight from a second end of the at least a portion of the first hydraulic hose, applying heat to a first region of the at least a portion of the first hydraulic hose, monitoring a displacement of the first weight, and removing heat from the first region of the at least a portion of the first hydraulic hose when the displacement of the first weight meets or exceeds a predetermined threshold.

In some implementations, the adding at least one tapered section to the second hydraulic hose includes affixing a third end of at least a portion of the second hydraulic hose to a second suspension point, hanging a second weight from a fourth end of the at least a portion of the second hydraulic hose, applying heat to a first region of the at least a portion of the second hydraulic hose, monitoring a displacement of the second weight, and removing heat from the first region of the at least a portion of the second hydraulic hose when the displacement of the second weight meets or exceeds a predetermined threshold.

In some implementations, the hanging a first weight from a second end of the at least a portion of the first hydraulic hose and the hanging a second weight from a fourth end of the at least a portion of the second hydraulic hose includes hanging a common weight from the second end of the at least a portion of the first hydraulic hose and the fourth end of the at least a portion of the second hydraulic hose.

In some implementations, the applying heat to a first region of the at least a portion of the first and the second hydraulic hose includes applying heat from a common external heating source.

In some implementations, the method may further comprise applying heat to a second region of the at least a portion of the first and the second hydraulic hose.

The removing heat from the first region of the at least a portion of the first hydraulic hose when the displacement of the first weight meets or exceeds a predetermined threshold may cause the at least one tapered section to include a predetermined taper.

The affixing a first end of at least a portion of the first hydraulic hose to a first suspension point may include affixing a first end of at least a portion of a thermoplastic hose.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
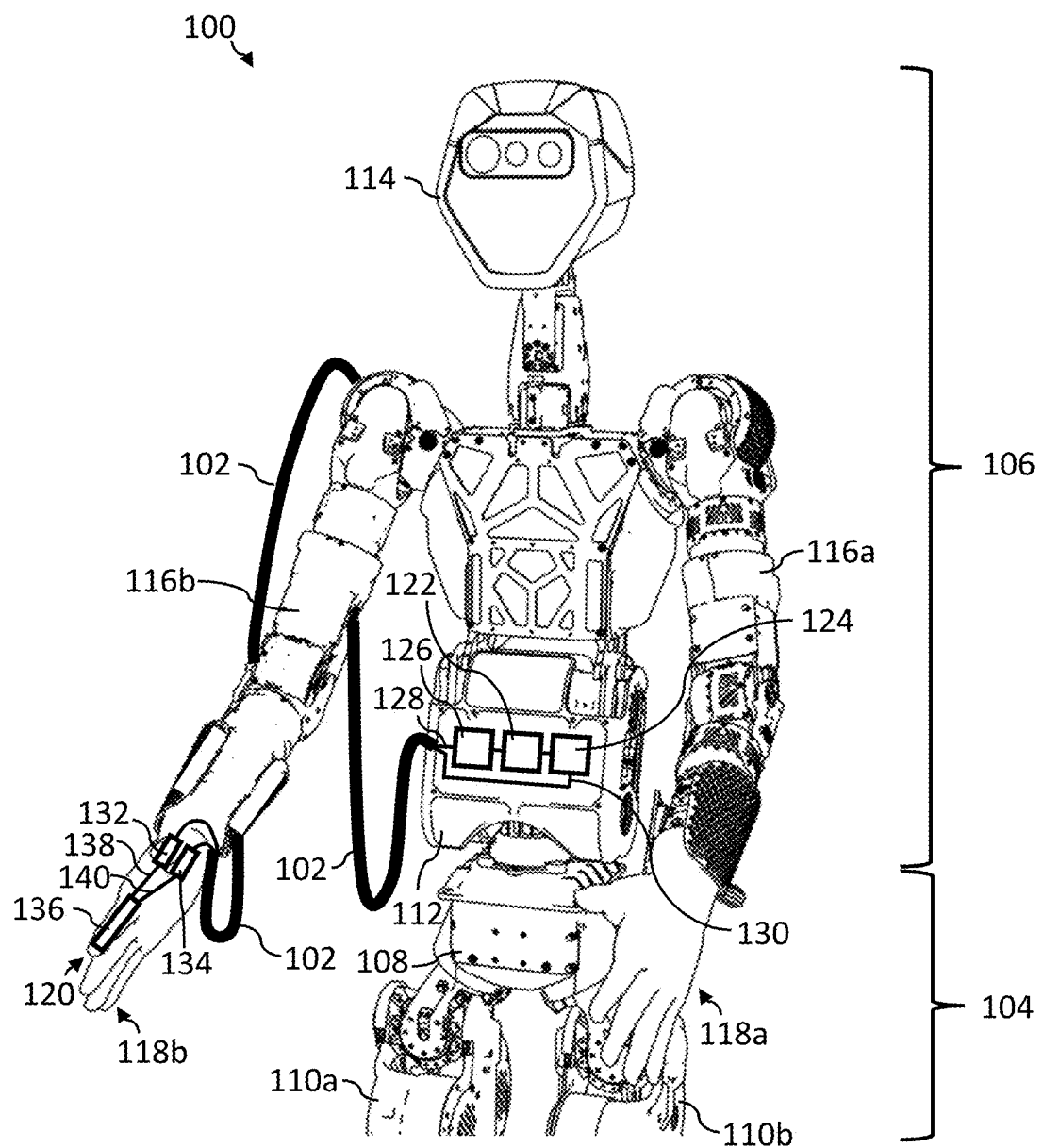
FIG. 1 is a schematic drawing of an example implementation of a hydraulically-powered robot with an externally-routed bundle of hydraulic hoses, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various implementations described herein include systems, devices, and methods for hydraulically-powered robots. In particular, the various implementations described herein include hydraulically-powered systems for controlling an end effector of a robot. One aspect of the technology described below includes using tapered hydraulic hoses to advantageously provide greater flexibility and easier routing in the interior of a robot where volume is constrained by the robot's form factor. Another aspect of the technology is a method for tapering (e.g., applying a taper to) a hydraulic hose.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described herein includes hydraulic systems to provide power to an end effector of a robotic system (e.g., to a hand of a humanoid robot), wherein some or all of the hydraulic system is adapted and/or miniaturized to fit at least partially inside the robot (e.g., inside a robotic arm).

In some implementations, the robot includes one or more pivot joints. A pivot joint allows for rotational motion. One example of a pivot joint is a ball-and-socket joint (e.g., a shoulder joint) which typically allows for a broad range of motion suitable for complex tasks. Another example of a pivot joint is a Condyloid joint (e.g., a wrist joint) which allows movement in two planes. Yet another example of a pivot joint is a hinged joint (e.g., an elbow joint) which allows movement in a single plane only. In some implementations, at least a portion of the hydraulic system (e.g., at least one hydraulic hose) is routed through a shoulder, an elbow, a forearm, a wrist and/or a knuckle of the robotic arm.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on controlling a hand of a humanoid robot, a person of skill in the art will appreciate that a hydraulic system in accordance with the present technology may be used to control a hand, a foot, a tail, a head, or any applicable end effector or actuator.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

FIG. 1 is a schematic drawing of an example implementation of a hydraulically-powered robot 100 with an externally-routed bundle of hoses 102, in accordance with the present systems, devices, and methods. Hoses are also referred to in the present application as hydraulic hoses.

Robot 100 comprises a base 104 and a humanoid upper body 106. Base 104 comprises a pelvic region 108 and two legs 110a and 110b (collectively referred to as legs 110). Only the upper portion of legs 110 is shown in FIG. 1. In other example implementations, base 104 may comprise a stand and (optionally) one or more wheels.

Upper body 106 comprises a torso 112, a head 114, a left-side arm 116a and a right-side arm 116b (collectively referred to as arms 116), and a left hand 118a and a right hand 118b (collectively referred to as hands 118). Arms 116 of robot 100 are also referred to in the present application as robotic arms. Arms 116 of robot 100 are humanoid arms. In other implementations, arms 116 have a form factor that is different from a form factor of a humanoid arm.

Hands 118 are also referred to in the present application as end effectors. In other implementations, hands 118 have a form factor that is different from a form factor of a humanoid hand. Each of hands 118 comprises one or more digits, for example, digit 120 of hand 118b. Digits may include fingers, thumbs, or similar structures of the hand or end effector.

In some implementations, base 104 and/or torso 112 of upper body 106 house a hydraulic control system, for example. In some implementations, components of the hydraulic control system may alternatively be located outside the robot, e.g., on a wheeled unit that rolls with the robot as it moves around, or in a fixed station to which the robot is tethered. The hydraulic control system of robot 100 comprises a hydraulic pump 122, a reservoir 124, and an accumulator 126, housed in torso 112. Bundle of hoses 102 includes hoses 128 and 130. Hose 128 provides a hydraulic coupling between accumulator 126 and a pressure valve 132 of the hydraulic control system. Hose 130 provides a hydraulic coupling between an exhaust valve 134 of the hydraulic control system and reservoir 124.

Pressure valve 132 is hydraulically coupled to an actuation piston 136 by a hose 138. Actuation piston is hydraulically coupled to exhaust valve 134 by a hose 140. Hoses 128 and 138, and pressure valve 132, provide a forward path to actuation piston 136. Hoses 130 and 140, and exhaust valve 134 provide a return path to actuation piston 136. Pressure valve 132 and exhaust valve 134 can control actuation piston 136, and can cause actuation piston 136 to move, which can cause a corresponding motion of at least a portion of hand 118*b*, for example, digit 120.

In some implementations, pressure valve 132 and exhaust valve 134 are electrohydraulic servo valves controlled by a controller (not shown in FIG. 1). The electrohydraulic servo valves are also referred to in the present application as servo valves and servo-controlled valves. The controller may be implemented by any suitable combination of hardware, software, and/or firmware. The controller may include, for example one or more application-specific integrated circuit (s), standard integrated circuit(s), and/or computer program (s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 100, for example, in hand 118*b*. When the drive piston is driven by the motor, the actuation piston can be forced to move, which can cause a corresponding motion of at least a portion of robot 100.

In some implementations, the hydraulic fluid in the hydraulic hoses of FIG. 1 (including hoses 128 and 130) is an oil, for example, peanut oil or mineral oil.

Each of hands 118 may have more than one degree of freedom (DOF). In some implementations, each hand has up to eighteen (18) DOFs. Each DOF can be driven by a respective actuation piston (for example, actuation piston 136). For clarity of illustration, only one actuation piston is shown in FIG. 1. Each actuation piston may be located in hands 118.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 118 to control eighteen (18) DOFs of each hand. For example, in FIG. 1, robot 100 includes hoses 128 and 130 that belong to bundle of hoses 102 that passes behind, or alongside, torso 112 and around the outside of arm 116*b*. In some implementations, bundle of hoses 102 can accommodate twenty (20) one-eighth inch (⅛ in.) hoses.

A shortcoming of the implementation of robot 100 shown in FIG. 1 can be a presence of external hydraulic coupling (e.g., bundle 102 of FIG. 1). As shown in FIG. 1, a bundle of hydraulic hoses may run between hydraulic components located, for example, in the base or torso of the robot, and actuators located, for example, in an end effector at the end of a robotic arm. As described above, in some implementations, there can be as many as twenty (20) one-eighth inch (⅛ in.) hoses in a bundle. As previously described, the bundle of hoses can increase the overall dimensions of the robot, make it harder to fit into restricted spaces, and add a risk the bundle will snag on objects in the robot's environment thereby causing damage to the robot and/or its environment.

Figure 2:
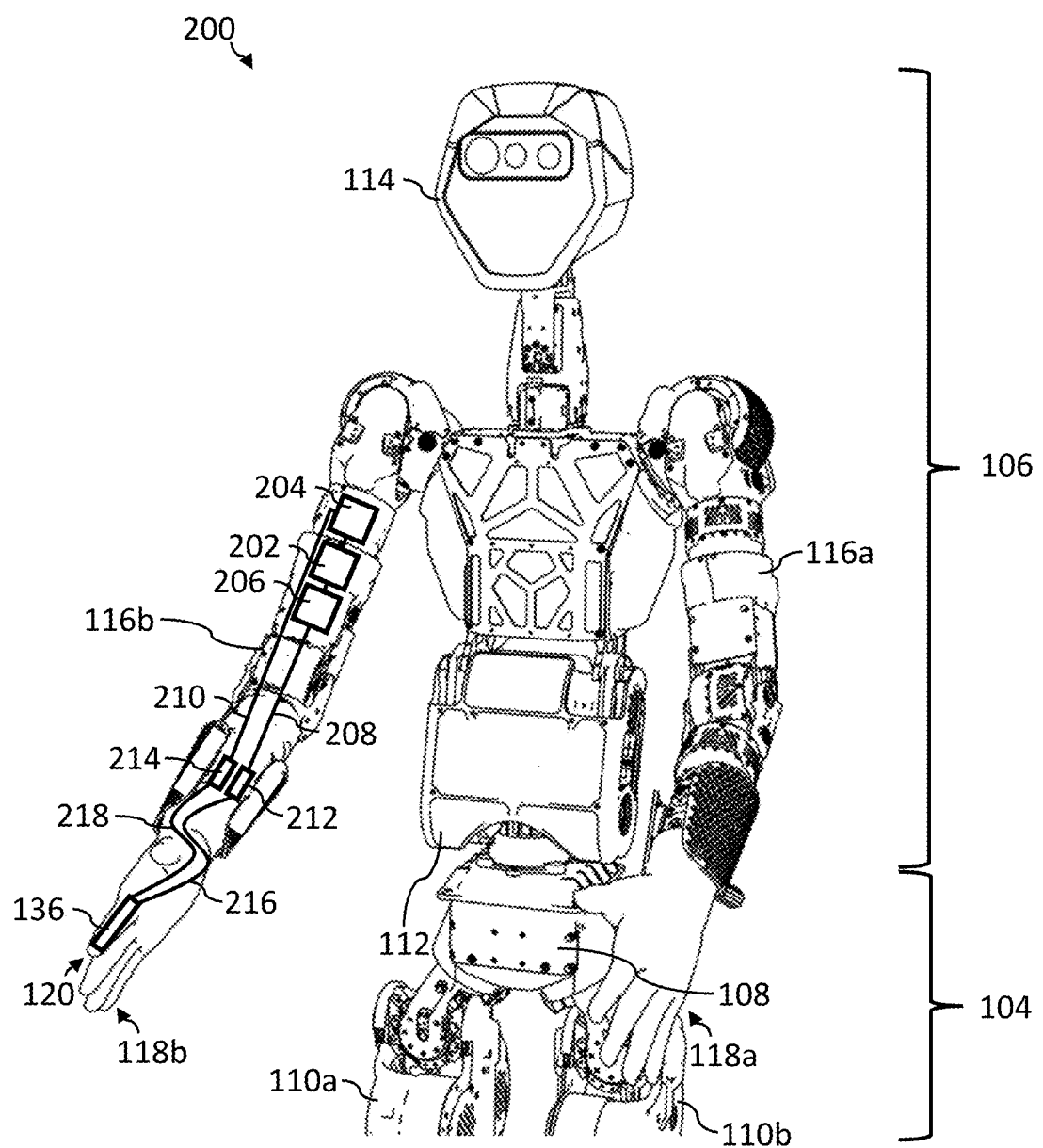
FIG. 2 is a schematic drawing of an example implementation of a hydraulically-powered robot with a hydraulic pump integrated with an arm of the robot, in accordance with the present systems, devices, and methods.

FIG. 2 is a schematic diagram of an example implementation of a hydraulically-powered robot 200 with a hydraulic pump 202 integrated with arm 116*b* of robot 200, in accordance with the present systems, devices, and methods. Components of robot 200 that are the same as, or similar to, components of robot 100 of FIG. 1 have the same reference numerals. In some implementations, a robot with an integrated hydraulic system, such as robot 200 of FIG. 2, may employ any or all of the teachings of U.S. Provisional Patent Application Ser. No. 63/191,732, filed May 21, 2021 and entitled "Systems, Devices, and Methods for A Hydraulic Robot Arm" (now U.S. patent application Ser. No. 17/749, 536), which is incorporated herein by reference in its entirety.

Robot 200 differs from robot 100 of FIG. 1 in the distribution of components of the hydraulic system and the routing of hydraulic hoses to actuation pistons (e.g., actuation piston 136). An actuation piston is an example of a hydraulically-activated component. As described with reference to FIG. 1, robot 100 includes bundle of hoses 102 that runs externally from torso 112 to hand 118*b*. Bundle of hoses 102 can have a number of disadvantages, as described above.

Robot 200 comprises a hydraulic pump 202, a reservoir 204, and an accumulator 206 that are housed in robotic arm 116*b*. Housing hydraulic pump 202, reservoir 204, and accumulator 206 in robotic arm 116*b* advantageously eliminates the external bundle of hoses.

Robot 200 further comprises hoses 208 and 210. Hose 208 provides a hydraulic coupling between accumulator 206 and a pressure valve 212. Hose 210 provides a hydraulic coupling between an exhaust valve 214 and reservoir 204. Robot 200 further comprises hose 216 which runs from pressure valve 212 to actuation piston 136, and hose 218 which runs to exhaust valve 214 from actuation piston 136. Hoses 208 and 216, and pressure valve 212, provide a forward path to actuation piston 136. Hoses 210 and 218, and exhaust valve 214 provide a return path from actuation piston 136.

Hydraulic hoses in general, and in robotic applications in particular, typically have a constant diameter. Advantages of hydraulic hoses with constant diameter can include constancy of hydraulic pressure, simpler fitting selection, and reduced risk of a hose/fitting mismatch. In restricted spaces (e.g., in the interior of a robot, particularly in pivot joints of a robot), it can be advantageous to reduce a diameter of one or more hydraulic hoses to increase flexibility, facilitate routing, and increase the number of hoses that can be accommodated in the space.

A restricted space may be a space that is restricted in volume, where it may be difficult to accommodate hydraulic hoses because there is insufficient room to accommodate the hydraulic hoses easily. A restricted space may also be a space with another kind of restriction. For example, a restricted space may include moving components that can interfere with hydraulic hoses in the space and/or hydraulic hoses traversing the space. A restricted space may have a volume and/or a shape that can change during operation, e.g., when the robot is in motion or is executing a task. A joint (e.g., shoulder, elbow, wrist, knee, ankle, hip, hand, finger, knuckle, foot, toe, and the like) is an example of a restricted space.

Reducing the diameter of hoses along their entire length can increase fluid losses. Fluid losses refer to a pressure drop along a length of the hydraulic hose. In accordance with the present systems, devices, and methods, a hydraulic hose having a diameter that varies along its length may be employed. In an implementation, a hydraulic hose passing through a restricted space (e.g., a pivot joint such as a shoulder, an elbow, a wrist, or a knuckle) includes a section of hose with a reduced diameter. The hose can include a tapering from a larger diameter to a smaller diameter. Once through the restricted space, the hose can optionally be flared from the smaller diameter back up to the larger diameter.

By including one or more sections of reduced diameter, with tapering of the diameter from the larger diameter to the smaller diameter, and optionally flaring back up again, flexibility of hoses can be increased, their routing through restricted spaces improved, and/or the number of hoses that can be accommodated increased, while keeping fluid losses as low as possible.

There can be a tradeoff between different hydraulic hose diameters. Increasing a diameter of a hydraulic hose can at least reduce fluid losses. Decreasing a diameter of a hydraulic hose can provide more flexibility in the hose, cause the hose to occupy less space, and make it easier to route the hose through a restricted space (e.g., a pivot joint).

In accordance with the present systems, devices, and methods, a hydraulic hose can have one or more tapered sections along a length of the hose. A hydraulic hose with one or more tapered section(s) can be installed in a robot such that the one or more tapered section(s) coincide with particular locations along the fluid path, such as restricted spaces and/or parts of the robot requiring greater flexibility. One hose may have multiple tapered sections along a length of the hose. Tapered sections may be different lengths. Tapered sections may taper to different diameters and/or at different rates. A taper and a flare in a tapered section may be separated by a waist. The waist may be a point at which the taper directly adjoins the flare. Alternatively, the waist may have a non-zero length.

In some implementations, tapering a single hose from a first (larger) diameter to a second (smaller) diameter can be used in lieu of a fitting coupling between a first hose of the first diameter and a second hose of the second diameter. In such implementations, tapering can be advantageous, at least because a tapering takes up less space than a fitting, is simpler to implement and maintain, is less prone to leaks, is potentially more cost effective, and may introduce fewer disruptions to the flow of hydraulic fluid. Similarly, flaring a single hose from a second (smaller) diameter to a second (larger) diameter can be used in lieu of a fitting coupling between a first hose of the second diameter and a second hose of the first diameter and afford similar advantages to the foregoing.

Though the example implementations of FIGS. 1 and 2 of hydraulically-powered robots with hydraulic systems include only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 200). A hydraulic system dedicated to a single component or device, or dedicated to a subset of the multiple components or devices, may be more localized, and more readily adapted to fit within a desired form factor.

Figure 3:
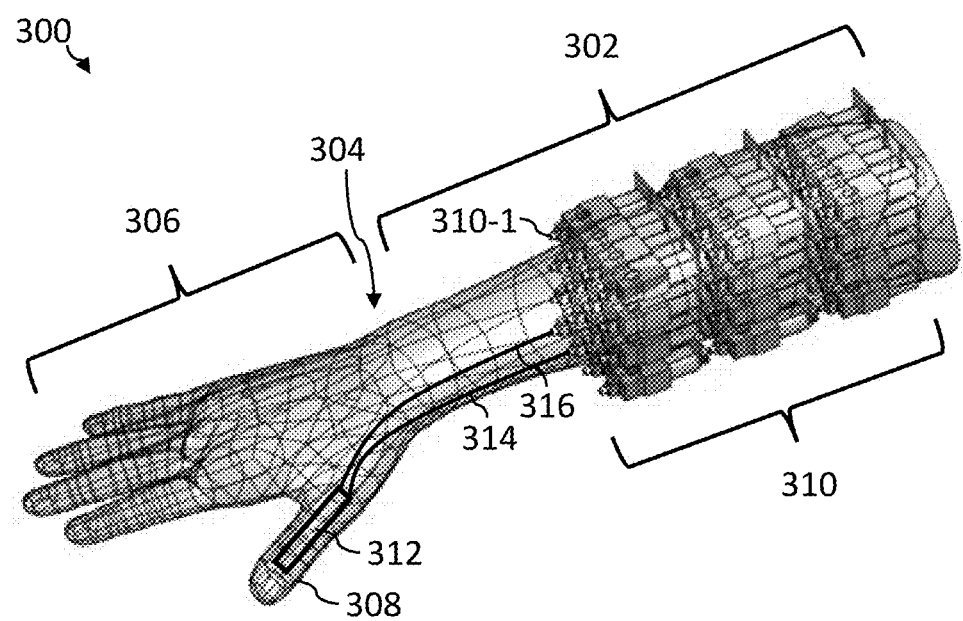
FIG. 3 is a schematic drawing of an example implementation of a portion of a hydraulic system in a forearm, wrist, and hand of a robot (e.g., the robot of FIG. 2), in accordance with the present systems, devices, and methods.

FIG. 3 is a schematic drawing of an example implementation of a portion 300 of a hydraulic system in a forearm 302, wrist 304, and hand 306 of a robot (e.g., robot 200 of FIG. 2), in accordance with the present systems, devices, and methods. Hand 306 includes a digit 308.

Forearm 302 includes a set of valves 310 which is integrated with forearm 302. Valves 310 include valve 310-1. (Only one valve is separately labeled for clarity of illustration.) Valves 310 may include pressure valves and exhaust valves. Valves 310 may include electrohydraulic servo valves, and may be operated by a controller (not shown in FIG. 3).

Digit 308 includes an actuation piston 312 integrated with digit 308. Actuation piston 312 is hydraulically coupled to valves 310 via a pressure hose 314 and an exhaust hose 316.

Pressure hose 314 and exhaust hose 316 pass through wrist 304. Wrist 304 can be a restricted space (as described above), and, while the diameters of hoses 314 and 316 may generally need to be large enough to fulfill the pressure/force requirements of hydraulic system 300, it can be advantageous for a respective diameter of each of hoses 314 and 316 to be small enough, and flexible enough, in the region of wrist 304, to navigate wrist 304.

Figure 4:
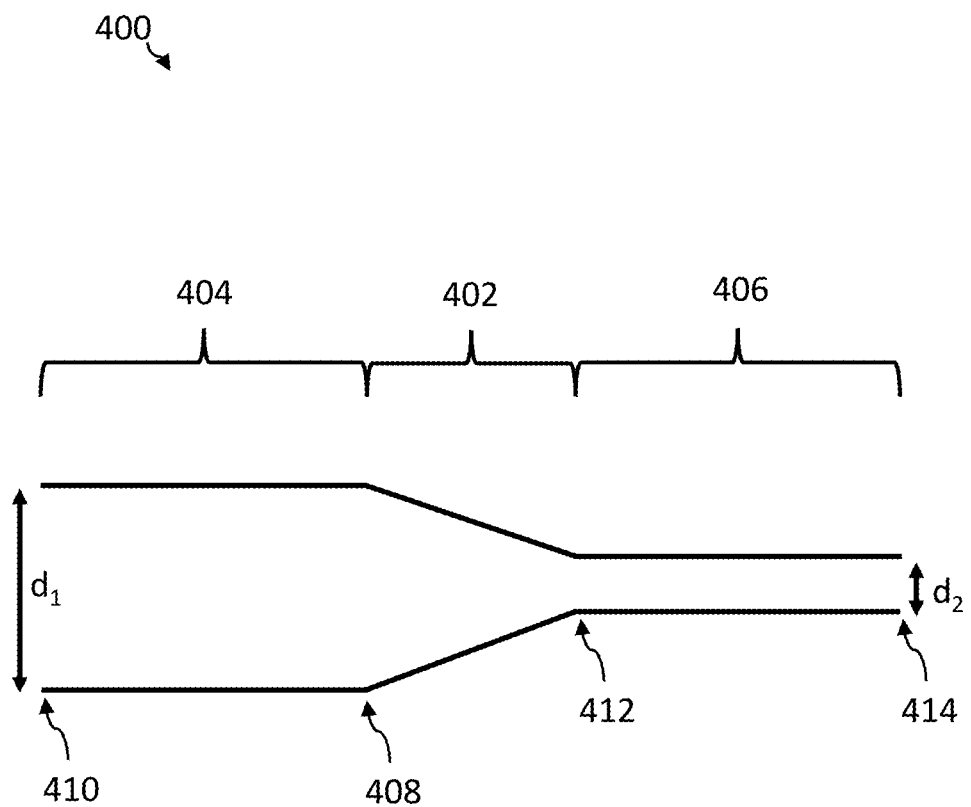
FIG. 4 is a schematic drawing of a cross-sectional profile of a portion of a tapered hydraulic hose with a single tapered section, in accordance with the present systems, devices, and methods.

FIG. 4 is a schematic drawing of a cross-sectional profile of a portion 400 of a tapered hydraulic hose with a tapered section 402 that includes a single taper, in accordance with the present systems, devices, and methods. A taper in a hydraulic hose is a gradual narrowing of an inner diameter and/or an outer diameter of the hydraulic hose. While the tapering of tapered section 402 (and other tapered sections in the following description of FIGS. 5, 6, and 7) follows a linear profile in longitudinal cross-section, those of skill in the art will also appreciate that tapered sections can follow another suitable profile and need not be linear (e.g., a profile characterized by a second order equation, a third order equation, or a higher order equation).

Portion 400 of the tapered hydraulic hose includes a section 404 having a diameter $d_1$, and a section 406 having a diameter $d_2$. Diameter in the present application refers to inner diameter and/or outer diameter. A hydraulic hose may have a) a tapered inner diameter and a uniform outer diameter, b) a uniform inner diameter and a tapered outer diameter, and/or c) a tapered inner and outer diameter in which a wall thickness of the hose may be uniform or tapered.

Section 404 adjoins tapered section 402 at taper point 408. Section 404 has a length that runs from an end 410 of portion 400 to taper point 408. Section 406 adjoins tapered section 402 at taper point 412. Section 406 has a length that runs from an end 414 of portion 400 to taper point 412. Tapered section 402 has a diameter that tapers from a diameter of $d_1$ at taper point 408 to a diameter $d_2$ at taper point 412, where diameter $d_2$ is less than diameter $d_1$.

A length measured from taper point 408 to taper point 412 is referred to in the present application as a length of the taper of tapered section 402.

Figure 5:
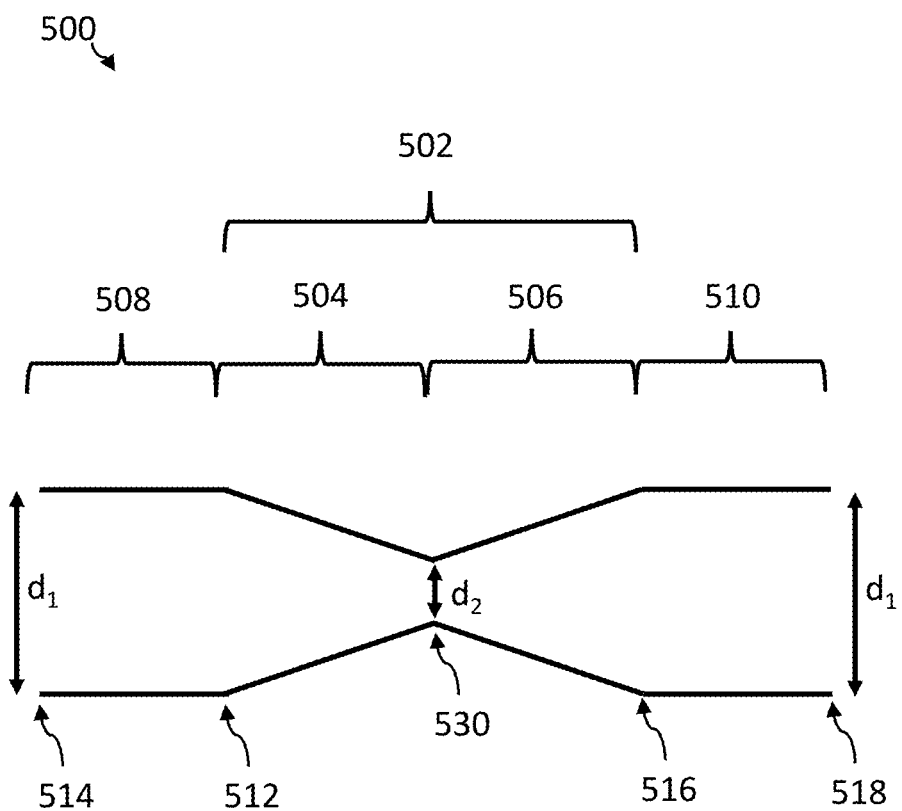
FIG. 5 is a schematic drawing of a cross-sectional profile of a portion of a tapered hydraulic hose with a tapered section that includes a taper and a flare, in accordance with the present systems, devices, and methods.

FIG. 5 is a schematic drawing of a cross-sectional profile of a portion 500 of a tapered hydraulic hose with a tapered section 502 that includes a taper 504 and a flare 506, in accordance with the present systems, devices, and methods. A flare in a hydraulic hose is a gradual widening of an inner diameter and/or an outer diameter of the hydraulic hose.

Portion 500 of the tapered hydraulic hose includes a section 508 having a diameter $d_1$, and a section 510 also having a diameter $d_1$. Section 508 adjoins tapered section 502 (and a wide end of taper 504) at taper point 512. Section 508 has a length that runs from an end 514 of portion 500 to taper point 512. Section 510 adjoins tapered section 502 (and a wide end of flare 506) at taper point 516. Section 510 has a length that runs from an end 518 of portion 500 to taper point 516.

Tapered section 502 has a diameter that decreases, continuously and monotonically, from a diameter of $d_1$ at taper point 512 to a diameter of $d_2$ at a waist point 530. Tapered section 502 has a diameter that increases from a diameter of $d_2$ at waist point 530 to a diameter of $d_1$ at taper point 516. Taper 504 and flare 506 meet at waist point 530.

Figure 6:
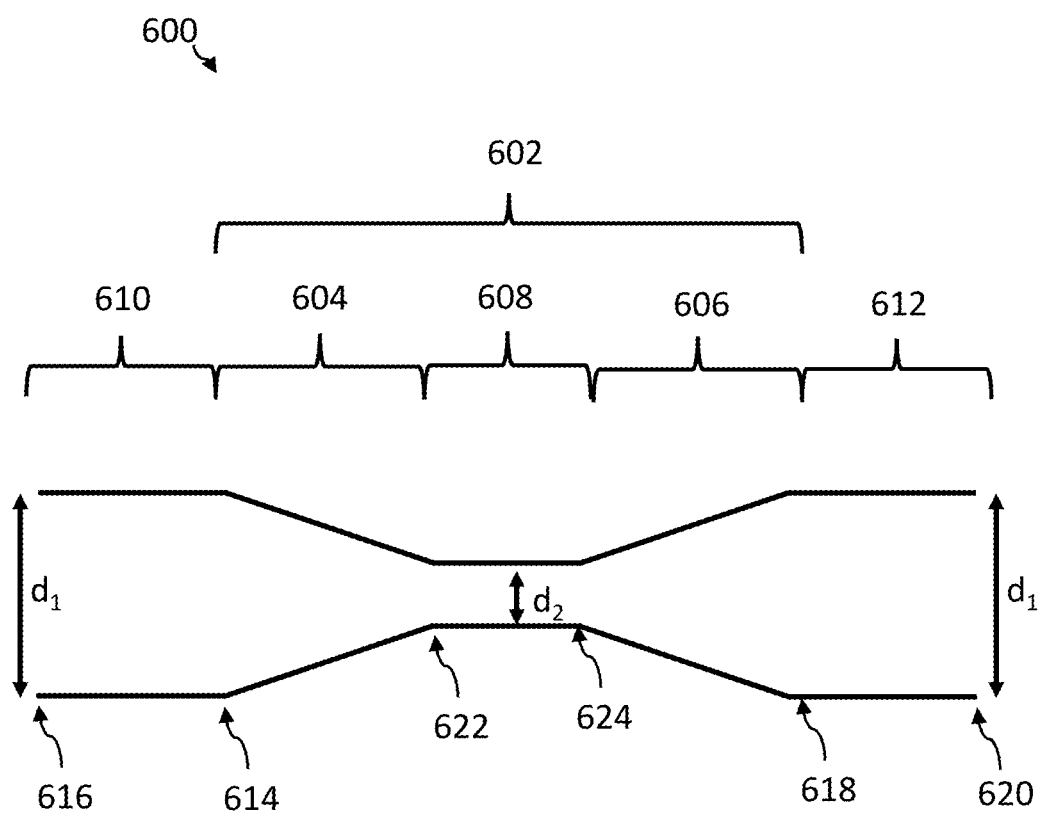
FIG. 6 is a schematic drawing of a cross-sectional profile of a portion of a tapered hydraulic hose with a tapered section that includes a taper and a flare, and a waist interposed therebetween, in accordance with the present systems, devices, and methods.

FIG. 6 is a schematic drawing of a cross-sectional profile of a portion 600 of a tapered hydraulic hose with a tapered section 602 that includes a taper 604 and a flare 606, and a waist 608 interposed therebetween, in accordance with the present systems, devices, and methods. Taper 604 and flare 606 are separated along the length of portion 600 by waist section 608.

Portion 600 of the tapered hydraulic hose includes a section 610 having a diameter $d_1$, and a section 612 also having a diameter $d_1$. Section 610 adjoins tapered section 602 (and a wide end of taper 604) at taper point 614. Section 610 has a length that runs from an end 616 of portion 600 to taper point 614. Section 612 adjoins tapered section 602 (and a wide end of flare 606) at taper point 618. Section 612 has a length that runs from an end 620 of portion 600 to taper point 618.

Tapered section 602 has a diameter that decreases (tapers) from a diameter of $d_1$ at taper point 614 to a diameter of $d_2$ at an end 622 of waist 608. Tapered section 602 has a diameter that increases (flares) from a diameter of $d_2$ at an end 624 of waist 608 to a diameter of $d_1$ at taper point 618. Diameter $d_2$ is less than diameter $d_1$.

In some implementations, a diameter of section 612 is different from a diameter of section 610. In some implementations, the hydraulic hose of which portion 600 is a part may be routed through a robotic system such that waist 608 aligns with, passes through, coincides with, and/or generally corresponds to a restricted space (e.g., a joint) in the robotic system. In this way, a length of the hose having a smaller diameter $d_2$ passes through the restricted space without a need for complicated, bulky, and leak-prone fittings.

Figure 7:
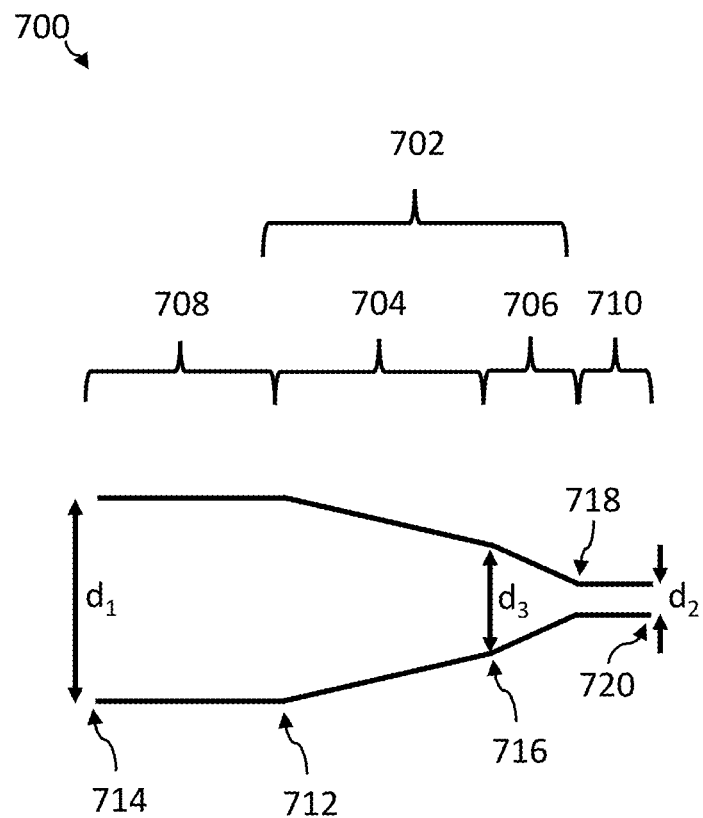
FIG. 7 is a schematic drawing of a cross-sectional profile of a portion of a tapered hydraulic hose with a tapered sections that includes two tapers, in accordance with the present systems, devices, and methods.

FIG. 7 is a schematic drawing of a cross-sectional profile of a portion 700 of a tapered hydraulic hose with a tapered section 702 that includes two tapers 704 and 706, in accordance with the present systems, devices, and methods. Portion 700 is an example implementation of a tapered hydraulic hose with multiple tapers. Those of skill in the art will appreciate that other implementations may have more than two tapers. Tapered sections may include one or more tapers, one or more flares and/or one or more waists.

Portion 700 of the tapered hydraulic hose includes a section 708 having a diameter $d_1$, and a section 710 having a diameter $d_2$. Section 708 adjoins tapered section 702 (and a wide end of taper 704) at taper point 712. Section 708 has a length that runs from an end 714 of portion 700 to taper point 712. Tapered section 702 has a diameter that tapers from a diameter of $d_1$ at taper point 712 to a diameter of $d_3$ at intermediate taper point 716.

Section 710 adjoins tapered section 702 (and a narrow end of taper 706) at taper point 718. Section 710 has a length that runs from an end 720 of portion 700 to taper point 718. Tapered section 702 has a diameter that tapers from a diameter of $d_3$ at intermediate taper point 716 to a diameter of $d_2$ at taper point 718. Tapers 704 and 706 meet at intermediate taper point 716. Diameter $d_3$ is less than diameter $d_1$, and diameter $d_2$ is less than diameter $d_3$. In some implementations, tapered section 702 includes a section of hose of constant diameter $d_3$ interposed between tapers 704 and 706.

Figure 8:
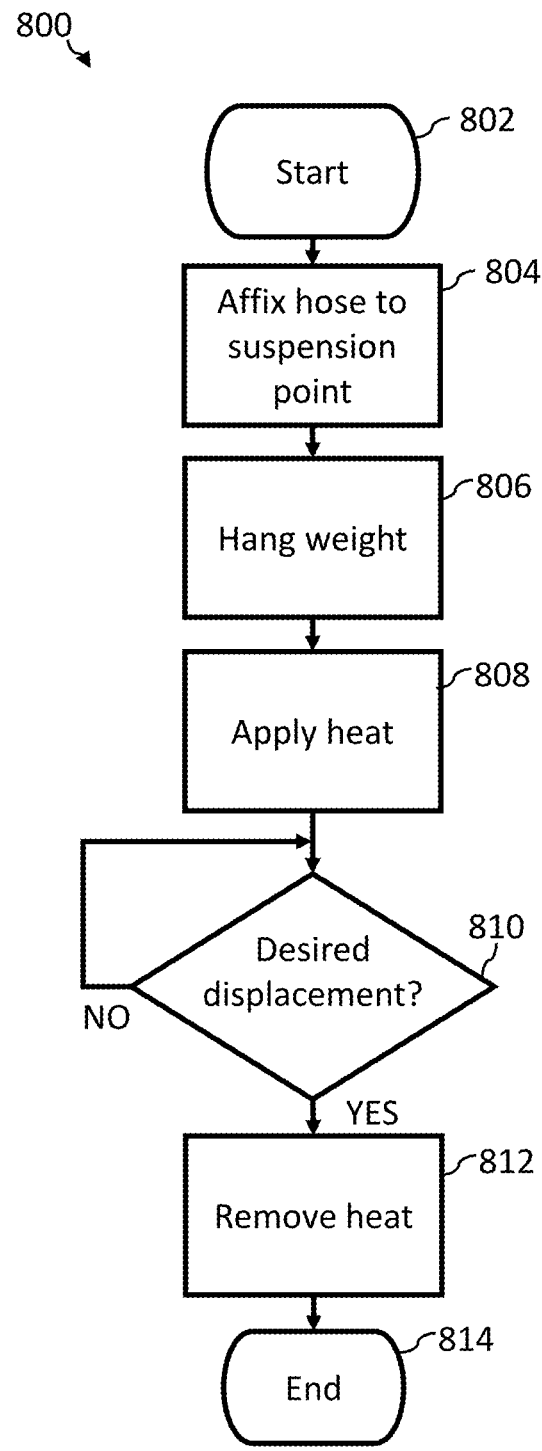
FIG. 8 is a flow chart of an example method for forming at least a portion of a tapered hydraulic hose (e.g., a hose including at least one of the portions of FIGS. 4, 5, 6, and 7), in accordance with the present systems, devices, and methods.

FIG. 8 is a flow chart of an example method 800 for forming at least a portion of a tapered hydraulic hose (e.g., a hose including at least one of the portions of FIGS. 4, 5, 6, and 7), in accordance with the present systems, devices, and methods. Method 800 of FIG. 8 includes seven (7) acts 802, 804, 806, 808, 810, 812, and 814. Those of skill in the art will appreciate that in alternative implementations certain acts of FIG. 8 may be omitted and/or additional acts may be added. Those of skill in the art will also appreciate that the illustrated order of the acts is shown for exemplary purposes only and may change in alternative implementations.

A hydraulic hose can be constructed of more than one material. The primary material of the hose can be selected to suit a particular application. An elastomeric (rubber) hose is highly flexible and commonly used in a variety of applications. A fluoropolymer hose typically has superior chemical and corrosion resistance, and can be suitable for high temperature operation, for example. A metal hose can handle very high pressures, for example. A thermoplastic hose can accommodate tight bend radii, and can be particularly effective at resisting kinking. A thermoplastic is a plastic polymer material that becomes pliable or moldable at a certain elevated temperature and solidifies upon cooling. A thermoplastic hose is particularly suitable for the method of FIGS. 8 and 9 (described below). An example of a thermoplastic is nylon.

At 802, in response to a starting condition (e.g., the receipt of a hydraulic hose and specification for a tapering of the hose), method 800 starts. At 804, an upper end of a hydraulic hose (e.g., end 514 of portion 500 of FIG. 5) is affixed to an elevated point from which the hydraulic hose can be suspended. The hydraulic hose is allowed to hang freely downwards so that the lower end (e.g., end 518 of portion 500 of FIG. 5) of the hydraulic hose hangs below the upper end. Prior to tapering, in some situations, the hydraulic hose may have a uniform inside and/or outside diameter. In other situations, the hydraulic hose may include one or more previously formed tapered sections.

At 806, a weight is affixed or hung from the lower end of the hydraulic hose. The weight may be any suitably weighted and sized object.

At 808, a heat source applies heat to a portion of the hydraulic hose under suspension. The heat source may be any suitable heat source, e.g., an electric heater, a heat gun etc. Applying heat can cause the material of the hydraulic hose to deform, and, in particular, to stretch under a force exerted by the hanging weight. As the hydraulic hose stretches, it can cause the weight to be displaced vertically downwards. The displacement can correlate with a degree of tapering of the hydraulic hose in the portion where heat is applied. The heat source can adjust the length of hose and the area on the hose to which heat is applied to create a desired shape of taper.

In some implementations, multiple hoses can be suspended adjacent to one another and the heat source can apply heat to a portion of each hose at the same time. In some implementations, a common weight is used for multiple hoses. Forming multiple tapered hydraulic hoses at the same time (for example, as described above) can advantageously result in a more consistent taper between the hoses, e.g., tapers that are in the same, or similar, positions, and are of the same, or similar, dimensions.

If, at 810, method 800 determines there is sufficient displacement of the weight, method 800 proceeds to 812 where the heat source is removed. Assuming properties of the hose material are uniform along a length of the hose, a displacement of the weight can be correlated with a thickness or diameter of the hydraulic hose at the taper. A sufficient displacement of the weight can be a displacement that correlates with a desired thickness or diameter of the hydraulic hose at the taper.

Determining there is sufficient displacement of the weight can include monitoring of the displacement while the heat source applies heat to the hydraulic hose. The displacement can be monitored, for example, by a human operator and/or by a device operating automatically or semi-automatically. Sufficient displacement may be defined by a predetermined threshold displacement, for example. At 814, method 800 ends, and the tapered hose is removed from where it was suspended.

Figure 9:
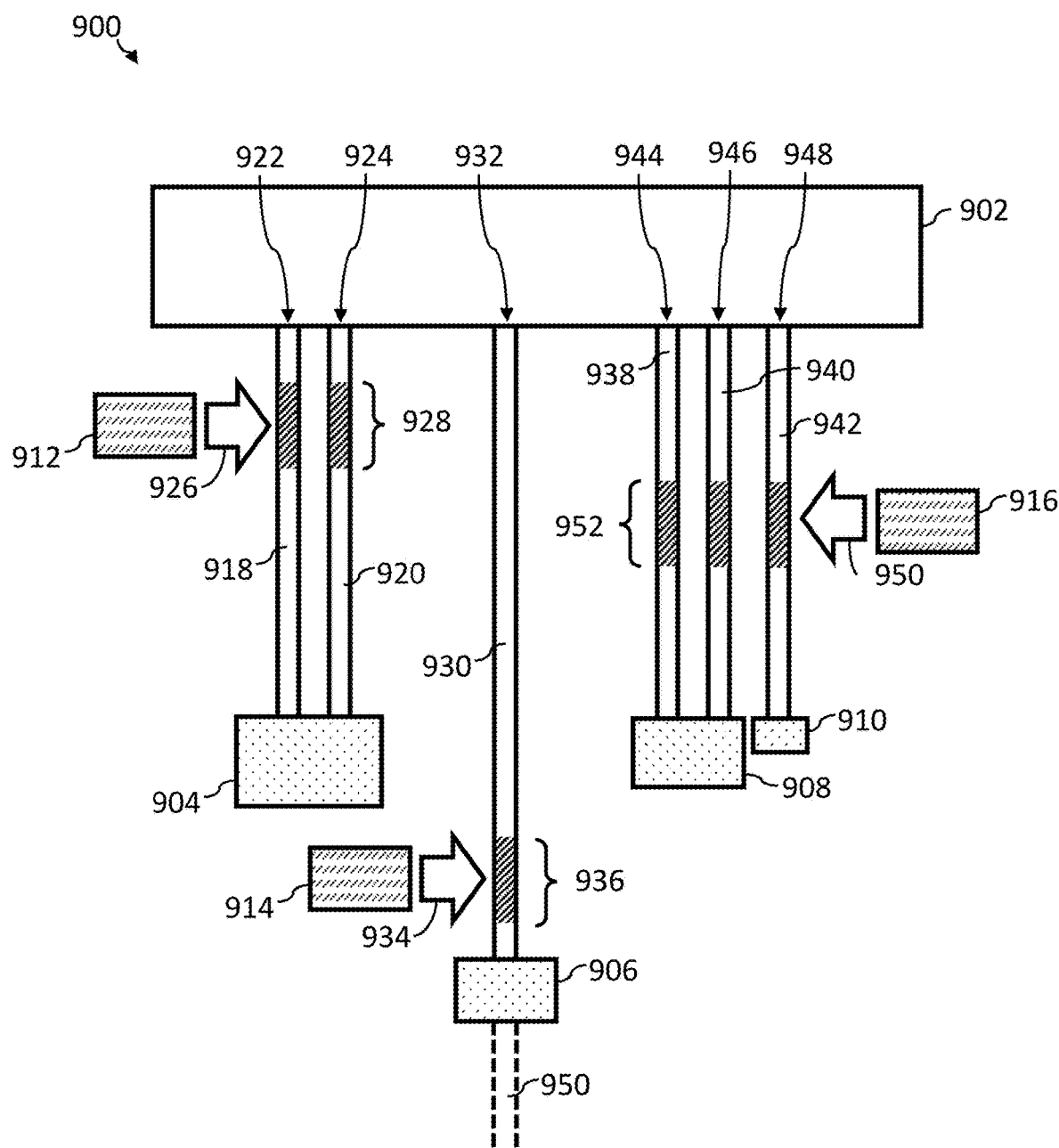
FIG. 9 is a schematic diagram illustrating an apparatus for tapering of multiple hydraulic hoses using the method of FIG. 8, in accordance with the present systems, devices, and methods.

FIG. 9 is a schematic diagram illustrating an apparatus 900 for tapering of multiple hydraulic hoses using method 800 of FIG. 8, in accordance with the present systems, devices, and methods. Apparatus 900 comprises a supporting member 902 from which multiple hydraulic hoses 918, 920, 930, 938, 940, and 942 can be suspended. Apparatus 900 further comprises weights 904, 906, 908, and 910, and heat sources 912, 914, and 916.

Hoses 918 and 920 are affixed at suspension points 922 and 924, respectively, on supporting member 902. Common weight 904 is hung from a respective lower end of each of hoses 918 and 920. Heat source 912 applies heat (indicated by arrow 926) to region 928 of hoses 918 and 920.

Hose 930 is affixed at suspension point 932, and weight 906 is hung from a lower end of hose 930. Heat source 914 applies heat (indicated by arrow 934) to region 936 of hose 930.

Hoses 938, 940, and 942 are affixed at suspension points 944, 946, and 948, respectively, on supporting member 902. Common weight 908 is hung from a respective lower end of each of hoses 938 and 940. Weight 910 is hung from a lower end of hose 942. Heat source 916 applies heat (indicated by arrow 950) to region 952 of hoses 938, 940, and 942.

In one implementation, a weight (e.g., weight 906) is attached to a hydraulic hose (e.g., hose 930) at an intermediate position along the hose leaving a section of hose (e.g., a section 950 of hose 930 indicated by dotted lines) below the weight.

Figure 10:
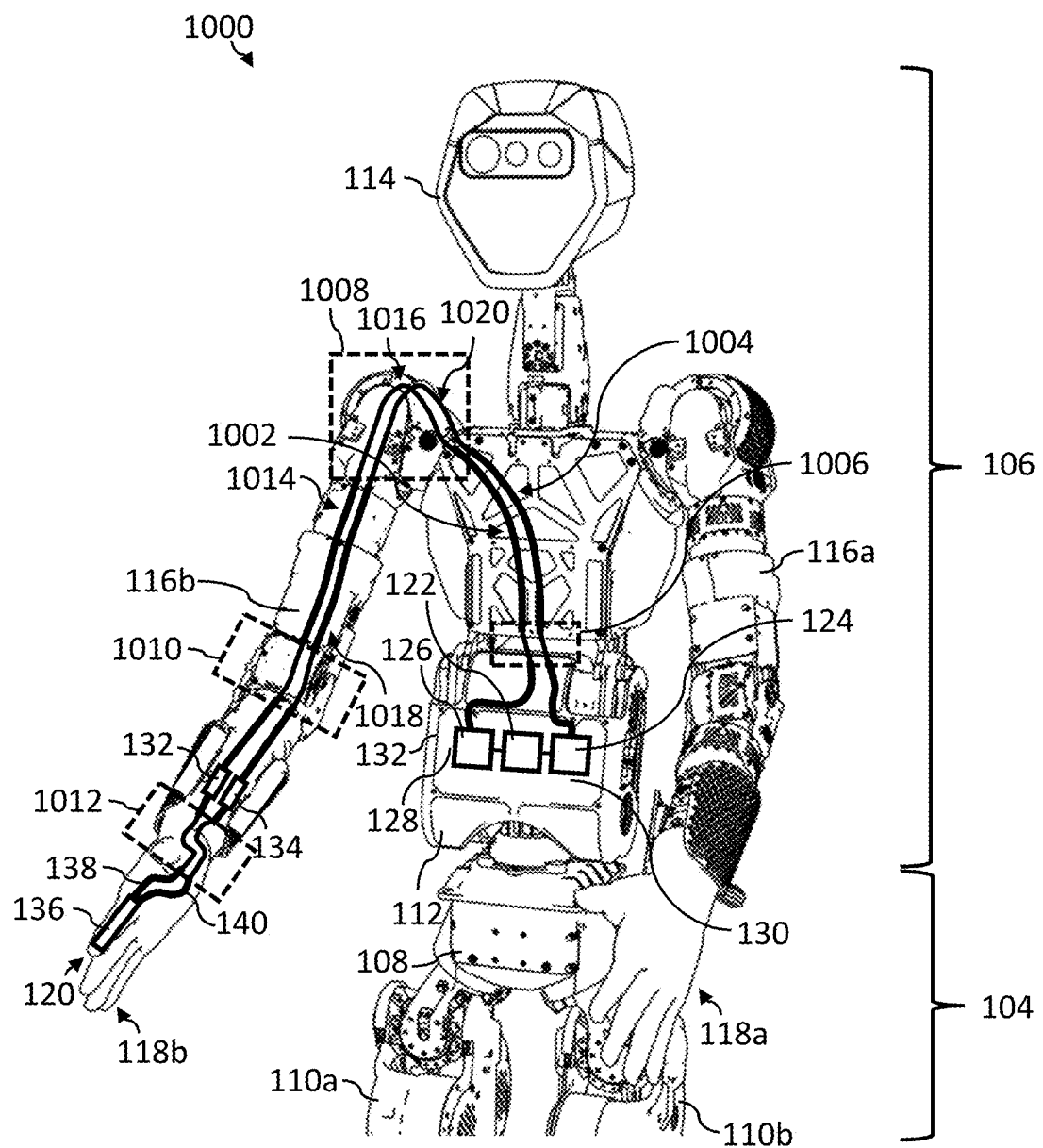
FIG. 10 is a schematic diagram of an example implementation of a hydraulically-powered robot with a tapered hydraulic hose, in accordance with the present systems, devices, and methods.

FIG. 10 is a schematic diagram of an example implementation of a hydraulically-powered robot 1000 with a tapered hydraulic hose, in accordance with the present systems, devices, and methods. Components of robot 1000 that are the same as, or similar to, components of robot 100 of FIG. 1 have the same reference numerals. Robot 1000 differs from robot 100 of FIG. 1 in the routing of hydraulic hoses 1002 and 1004 from the hydraulic control system (e.g., hydraulic pump 122, reservoir 124, and accumulator 126) to a hydraulically-actuated component (e.g., actuation piston 136). Hydraulic hoses 1002 and 1004 are routed internally to robot 1000. Hydraulic hoses 1002 and 1004 pass through restricted spaces 1006, 1008, 1010, and 1012. Restricted spaces 1006, 1008, 1010, and 1012 are pivot joints for the torso, shoulder, elbow, and wrist, respectively.

Hydraulic hoses 1002 and 1004 include tapered sections that traverse each of the pivot joints. For example, hydraulic hose 1002 includes a non-tapered section 1014 of hose that passes internally through the upper arm (the upper part of arm 116b), and a tapered section 1016 that passes through restricted space 1008 at the shoulder. Hydraulic hose 1004 includes a non-tapered section 1018 of hose that passes internally through the upper arm (the upper part of arm 116b), and a tapered section 1020 that passes through restricted space 1008 at the shoulder.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot comprising:
a body, wherein the body includes a robotic arm and the robotic arm includes a hand;
a hydraulic control system; and
a hydraulically-actuated component physically coupled to the hand and operable to cause a motion of at least a portion of the hand, the hydraulically-actuated component hydraulically coupled to the hydraulic control system by at least a first hydraulic hose, the first hydraulic hose having a length, at least a portion of the length which extends from a first end to a second end, and a diameter, wherein the diameter of the first hydraulic hose at the first end is a first diameter, and wherein the at least a portion of the length includes a first tapered section in which the diameter of the first hydraulic hose decreases, continuously and monotonically, to a second diameter, the second diameter being less than the first diameter.

2. The robot of claim 1, wherein the first tapered section of the at least a portion of the length of the first hydraulic hose further comprises:
a first flare in which the diameter of the hydraulic hose increases along a length of the flare, continuously and monotonically, from the second diameter to the first diameter, wherein the diameter of the first hydraulic hose at the second end is the first diameter.

3. The robot of claim 2, wherein the first tapered section of the at least a portion of the length of the first hydraulic hose further comprises:

a waist, where the diameter of the hydraulic hose is the second diameter along a length of the waist.

4. The robot of claim 1, wherein the body includes a first restricted region through which the first tapered section of the at least a portion of the length of the first hydraulic hose passes in traversing a path between the hydraulic control system and the hydraulically-actuated component.

5. The robot of claim 4, further comprising a second hydraulic hose, the second hydraulic hose having a length, at least a portion of the length which extends from a third end to a fourth end, and a diameter, wherein the diameter of the second hydraulic hose at both the third end and the fourth end is a third diameter, and wherein the at least a portion of the length includes a second tapered section in which the diameter of the second hydraulic hose decreases, continuously and monotonically, to a fourth diameter, the fourth diameter being less than the third diameter, wherein the at least a portion of the length of the second hydraulic hose passes through the restricted region.

6. The robot of claim 4, wherein the restricted region is a pivot joint.

7. A robot comprising:
a body;
a hydraulic control system; and
a hydraulically-actuated component physically coupled to the body, the hydraulically-actuated component hydraulically coupled to the hydraulic control system by at least a first hydraulic hose, the first hydraulic hose having a length, at least a portion of the length which extends from a first end to a second end, and a diameter, wherein the diameter of the first hydraulic hose at the first end is a first diameter, and wherein the at least a portion of the length includes a first tapered section in which the diameter of the first hydraulic hose decreases, continuously and monotonically, to a second diameter, the second diameter being less than the first diameter, and wherein the body includes a first restricted region through which the first tapered section of the at least a portion of the length of the first hydraulic hose passes in traversing a path between the hydraulic control system and the hydraulically-actuated component.

8. The robot of claim 7, wherein the first tapered section of the at least a portion of the length of the first hydraulic hose further comprises:
a first flare in which the diameter of the hydraulic hose increases along a length of the flare, continuously and monotonically, from the second diameter to the first diameter, wherein the diameter of the first hydraulic hose at the second end is the first diameter.

9. The robot of claim 7, wherein the first tapered section of the at least a portion of the length of the first hydraulic hose further comprises:
a waist, where the diameter of the hydraulic hose is the second diameter along a length of the waist.

10. The robot of claim 7, wherein the body includes a robotic arm, the robotic arm includes a hand, and the hydraulically-actuated component is physically coupled to the hand and operable to cause a motion of at least a portion of the hand.

11. The robot of claim 7, further comprising a second hydraulic hose, the second hydraulic hose having a length, at least a portion of the length which extends from a third end to a fourth end, and a diameter, wherein the diameter of the second hydraulic hose at both the third end and the fourth end is a third diameter, and wherein the at least a portion of the length includes a second tapered section in which the diameter of the second hydraulic hose decreases, continuously and monotonically, to a fourth diameter, the fourth diameter being less than the third diameter, wherein the at least a portion of the length of the second hydraulic hose passes through the restricted region.

12. The robot of claim 7, wherein the restricted region is a pivot joint.

* * * * *